US006678612B1

(12) United States Patent
Khawam

(10) Patent No.: US 6,678,612 B1
(45) Date of Patent: Jan. 13, 2004

(54) WIRELESS VEHICLE LOCATION AND EMERGENCY NOTIFICATION SYSTEM

(76) Inventor: Maurice A. Khawam, 4132 Lomina Ave., Lakewood, CA (US) 90713

( * ) Notice: Subject to any disclaimer, the term of this patent is extended or adjusted under 35 U.S.C. 154(b) by 0 days.

(21) Appl. No.: 09/212,742

(22) Filed: Dec. 15, 1998

Related U.S. Application Data

(60) Provisional application No. 60/069,730, filed on Dec. 16, 1997.

(51) Int. Cl.[7] .......................... G06F 19/00; G01C 21/26

(52) U.S. Cl. .......................... 701/213; 701/29; 701/33; 340/426.15; 340/426.19; 340/438; 340/439; 340/825.36; 342/357.07; 342/357.17; 455/456.5; 702/183; 702/188

(58) Field of Search ................................ 701/213, 207, 701/214, 216, 29, 33, 31, 217; 342/357.07, 457, 386, 46, 357.03, 357.13, 357.17; 340/426, 539, 531, 438–439, 989, 993, 426.1, 426.13, 426.16, 426.15, 426.19, 825.36, 825.49; 702/182–185, 188; 455/404, 456, 456.1, 456.5

(56) References Cited

U.S. PATENT DOCUMENTS

| | | | | | |
|---|---|---|---|---|---|
| 4,258,421 | A | | 3/1981 | Juhasz et al. | 701/35 |
| 5,111,686 | A | | 5/1992 | Kamiya et al. | 73/117.3 |
| 5,223,844 | A | * | 6/1993 | Mansell et al. | 701/213 |
| 5,311,197 | A | * | 5/1994 | Sorden et al. | 342/457 |
| 5,445,347 | A | | 8/1995 | Ng | 246/169 R |
| 5,506,772 | A | | 4/1996 | Kubozono et al. | 701/29 |
| 5,598,167 | A | | 1/1997 | Zijderhand | 342/457 |
| 5,657,233 | A | | 8/1997 | Cherrington et al. | 705/400 |
| 5,719,771 | A | | 2/1998 | Buck et al. | 455/456.5 |
| 5,808,907 | A | | 9/1998 | Shetty et al. | 702/188 |
| RE35,920 | E | * | 10/1998 | Sorden et al. | 342/457 |
| 5,819,201 | A | | 10/1998 | DeGraaf | 701/208 |
| 5,825,283 | A | * | 10/1998 | Camhi | 340/438 |
| 5,835,871 | A | | 11/1998 | Smith et al. | 701/29 |
| 5,898,391 | A | | 4/1999 | Jefferies et al. | 340/988 |
| 5,933,080 | A | * | 8/1999 | Nojima | 340/539 |
| 5,945,919 | A | | 8/1999 | Trask | 340/825.49 |
| 5,982,325 | A | * | 11/1999 | Thornton et al. | 342/357.07 |
| 5,983,156 | A | * | 11/1999 | Andrews | 701/115 |

* cited by examiner

*Primary Examiner*—Jacques H. Louis-Jacques
(74) *Attorney, Agent, or Firm*—Aaron L. Patton

(57) ABSTRACT

In the event of an accident or another traumatic event to a vehicle, a wireless vehicle location and emergency notification system is provided for determining the location and sensing the condition of a vehicle, comparing this information to established parameters, and transmitting such information to a base station in the event the sensed condition or determined location is outside the established parameters. The base station may then alert local emergency services if necessary. The system utilizes a global positioning receiver for determining the location of the vehicle and sensors for monitoring vehicle conditions such as vehicle attitude, deceleration, shock, temperature and passenger compartment audio. The location and condition information is communicated to a data processor which compares this data to established parameters and recently stored location and condition data. If the location and/or condition information fall outside the established parameters or the new data does not compare with the recently stored data, a transmission is sent to the base station. This information is also communicated to a user interface unit, usually within the passenger compartment, which has a display, keypad, and speaker/microphone. The system operates continuously and without the need for user intervention.

27 Claims, 4 Drawing Sheets

WIRELESS VEHICLE LOCATION AND EMERGENCY NOTIFICATION SYSTEM

RELATED APPLICATION

This application claims priority from U.S. Provisional Application No. 60/069,730, filed Dec. 16, 1997.

BACKGROUND OF THE INVENTION

This invention relates to geographic location devices. More particularly, the present invention relates to a wireless location system which tracks the exact geographic location of a vehicle and communicates the vehicle's location by wireless transmission to an external fixed position in the event that a certain condition, such as an accident, occurs involving the vehicle.

It is not uncommon for vehicles, including automobiles and airplanes, to become lost, break down, or even be involved in an accident. The problems associated with such occurrences are exacerbated when in a remote location as there are fewer bypassers and support systems to aid those involved in the emergency.

With the advent of satellites and microelectronics, global positioning systems have been developed which can pinpoint a vehicle's exact location on the earth. Such systems, usually in the form of a hand-held device, are able to obtain their exact location anywhere in the world from a satellite. Although this may help a traveler who is lost, these systems do little for the traveler who is stranded or involved in an accident. Although many travelers carry cellular telephones, oftentimes these telephones have limited ranges. In any event, with the occurrence of an accident, the traveler may be incapacitated to the point of being unable to use his or her phone, even if it is within its calling range.

Thus, what is needed is a system which can alert an emergency support network when a traveler is lost, broken down, or involved in an accident, identifying the traveler and giving the travelers exact location. What is further needed is a system which notifies a support network of such an occurrence even when the traveler is incapacitated due to the occurrence. The present invention fulfills these needs and provides other related advantages.

SUMMARY OF THE INVENTION

The present invention resides in a wireless vehicle location and emergency notification system and a related method of operation. The system is capable not only of determining its geographic location using a global position receiver, but also senses and monitors vehicle conditions such as vehicle attitude, shock, deceleration, temperature and audio levels (including speech recognition). When the sensed condition and/or determined location fall outside predetermined established parameters, an information signal is transmitted to a base station indicating that a traumatic event has occurred to the vehicle. The station then notifies emergency services of the exact location and condition of the vehicle without direct intervention on behalf of a user of the vehicle. The system is useful in circumstances such as a vehicle accident, breakdown, theft or vandalism, and can detect rapid deceleration, roll-overs, vehicle malfunction and other traumatic events. Moreover, the system of the present invention may be used on all types of vehicles including, automobiles, aircraft, military vehicles and motorcycles.

The wireless vehicle location and emergency notification system generally comprises a data processor control unit, a global positioning receiver, a transmitter, at least one sensor, and a user interface unit. These elements are electronically interconnected through the data processor and may be integrally formed within a housing or independently mounted to the vehicle. An electrical source for the components of the system is typically, provided by a power source of the vehicle in the form of an electrical generator or battery, or an electric source associated with the vehicle and yet independent of any specific power source, such as a back-up system dedicated battery.

Although the system operates continuously, upon starting the vehicle the system performs a self-check initialization procedure which tests for system integrity and determines whether the user is valid or there is a new user. This can be accomplished in a variety of ways, but typically includes the use of the user interface unit. The user interface unit has a keypad into which a password may be entered, and/or a speaker and microphone which can be used for voice recognition. In addition to internal user identification procedures, the system may be notified by an external signal that an invalid user is using the vehicle, whereupon the system is either shut down, the vehicle is shut down or the vehicle tracked.

Geographic location is continuously sensed by the global positioning receiver having an antennae which receives location information from orbiting satellites. The global positioning receiver electronically communicates this information to the data processing control unit. Simultaneously, at least one sensor senses vehicle conditions in a variety of forms including temperature, passenger compartment audio levels, shock, tilt, vehicle attitude and deceleration. This information is also electronically communicated to the data processor unit.

The location and vehicle condition information is compared to predetermined established parameters and previously stored location and vehicle condition information. The received location and sensed condition information is electronically stored. If the received location and/or sensed vehicle conditions are outside the calibrated parameters or significantly different than the previously stored information, a signal containing this information is transmitted to the fixed station. The information is also communicated to the user interface unit, typically mounted in the passenger compartment, which displays the information.

The transmitted signal is received by the base station, which samples the information and, if necessary, notifies local emergency services of the vehicle's exact location and condition. The base station typically receives this information from a satellite or telephone connection. The base station is also able to send information to the vehicle in order to shut down an invalid user, track the vehicle, or communicate with the occupant of the vehicle.

Other-features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is a flow chart illustrating initialization steps taken when a vehicle is turned on.

DETAILED DESCRIPTION OF THE PREFERRED EMBODIMENT

Figure 1:
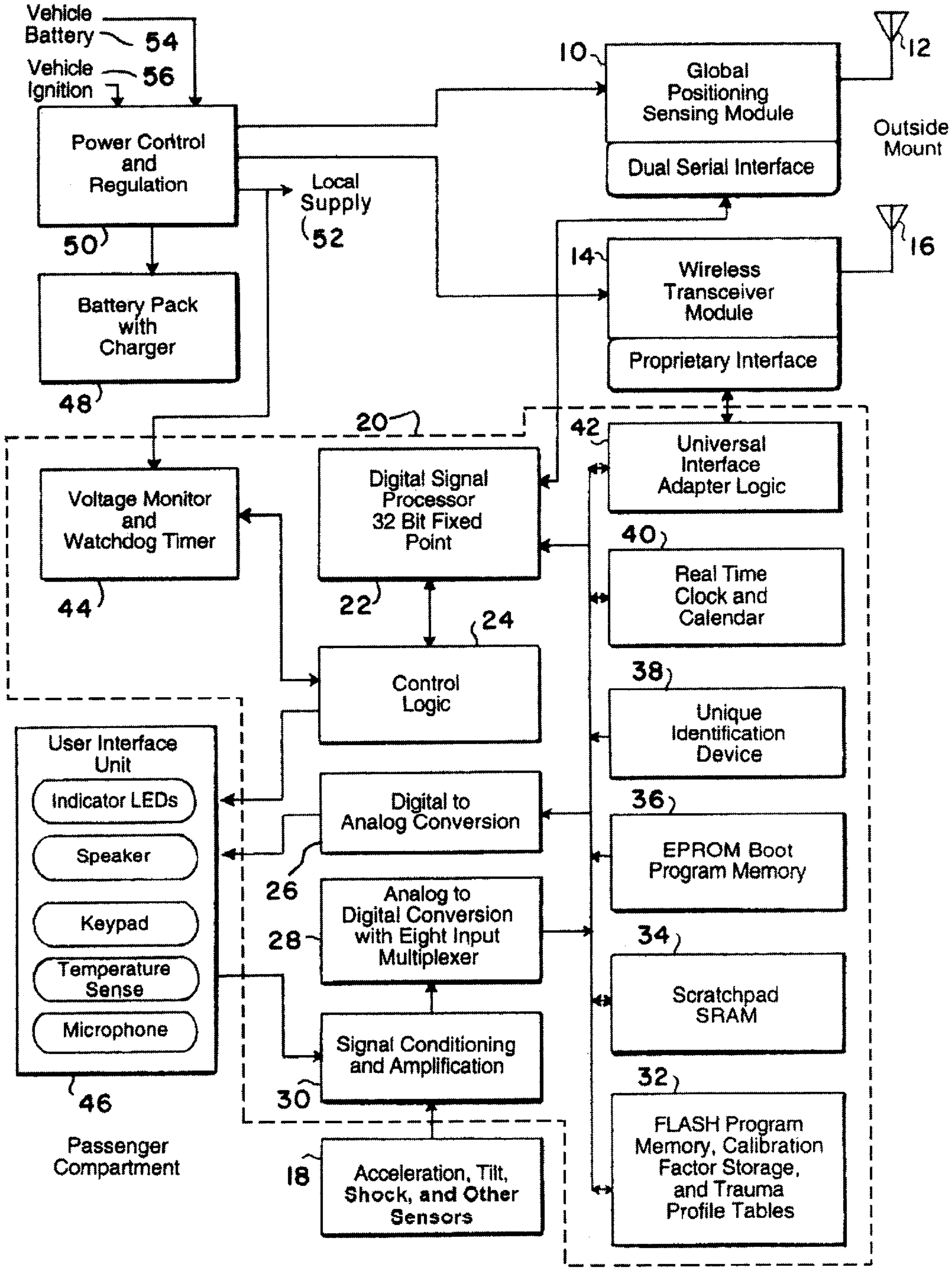
FIG. 1 is a block diagram for the vehicle components of wireless vehicle location and emergency notification system embodying the present invention.

As shown in the drawings for purposes of illustration, the present invention is concerned with a wireless vehicle location and emergency notification system for identifying and locating a vehicle in the event of an accident or other traumatic event. The system is comprised of two general components: a vehicle mobile transceiver unit (illustrated in FIG. 1) and a fixed monitoring station (illustrated in FIG. 2). Both components rely on wireless satellite communication for determining geographic position and sending location and vehicle condition data, voice communication, and telemetry information. In the event of a traumatic event (such as vehicle break down, an accident or theft) the on-board system senses the traumatic event and notifies the fixed monitoring station of this event, giving information including the condition and exact location of the vehicle. The fixed station can then notify local emergency services.

The mobile transceiver unit, as illustrated in FIG. 1, is typically mounted on a vehicle and includes, generally, a global position sensing receiver module 10 having an antennae 12, a wireless transceiver 14 for transmitting and receiving data having an antennae 16, at least one sensor 18 which determines physical vehicle conditions, a data processing and control unit (generally referred to by the numeral 20, and having subcomponents 22–44), a user interface unit 46, and an electric power source 48–56. The system may be used on all types of vehicles including, automobiles, aircraft, military vehicles and motorcycles.

Referring to the block diagram of FIG. 1, the global position sensing receiver module 10 is a receiver which receives its exact geographic location anywhere in the world from an orbiting satellite. The global position module will operate on DC power, typically from the vehicle, or a back-up battery within the mobile transceiver unit. The global position module 10 may be integrally mounted in the mobile unit with the other components, or separately from the other components. In any event, the global positioning receiver module 10 is mounted on an environmentally suitable location on the vehicle. The global position module's antennae 12 is mounted in a location unshielded by metal enclosure. If the antennae 12 is an active design requiring power, it operates from the same power source as the global positioning module 10. The global positioning module 10 will provide an interface for communication with the processor and control unit 20, communicating the position and other control instructions received by the processor and control unit 20.

The wireless transceiver 14 acts as a data link to a wireless satellite network. The transceiver 14 will operate on DC power, typically from the vehicle or a back-up battery within the mobile transceiver unit. The transceiver 14 may be integrally mounted in the unit housing with the other components of the system, or separately from the other components. In any event, the transceiver 14 is mounted on an environmentally suitable location on the vehicle. The transceiver's antennae 16 is mounted in a location unshielded by metal enclosure. If the antennae 16 is an active design requiring power, it operates from the same power source as the other components of the system. Data signals and control signals communicated to and from the processing and control unit 20 and transceiver 14 may be in digital form specified by the requirements of an interface of the transceiver 14.

The sensors 18 which detect and sense vehicle condition in the form of attitude, shock, tilt, temperature, audio levels within the passenger compartment, and deceleration may be in the form of transducers. The sensors 18 will be mounted within the unit housing or separate from the other components, as in the case of the sensor 18 for passenger compartment audio levels. The sensors 18 will be able to sense tilt, rollover, rapid linear deceleration and other vehicle conditions which are indicative of an accident or other traumatic event.

The data processor and control unit 20 also requires a suitable mounting location in the vehicle and operates on DC power. However, the data processing unit 20 requires an additional connection to the vehicle electrical system indicating whether the vehicle ignition's system is turned on or off. Included in the processor and control unit 20 is circuitry to interface the global positioning receiver module 10, transceiver 14 and sensors 18. The data processor unit 20 may also include circuitry to provide and condition power to the global positioning module 10, sensors 18 and transceiver 14. The circuitry may include battery recharging circuitry.

The data processor and control unit 20 will continuously input data from the global positioning module 10 and sensors 18 and filter unwanted signals and noise while comparing the processed location and vehicle attitude condition information to predetermined calibrated parameters to detect traumatic events. The data processor unit 20, upon detecting a traumatic event, will cause predetermined control actions to be performed, sending information via the transceiver 14 to the fixed station. The data processing unit 20 will also monitor any signals coming in from the transceiver 14 to execute a command to shut down the system or cease transmissions. Such signals would typically be sent from the fixed monitoring station.

Figure 2:
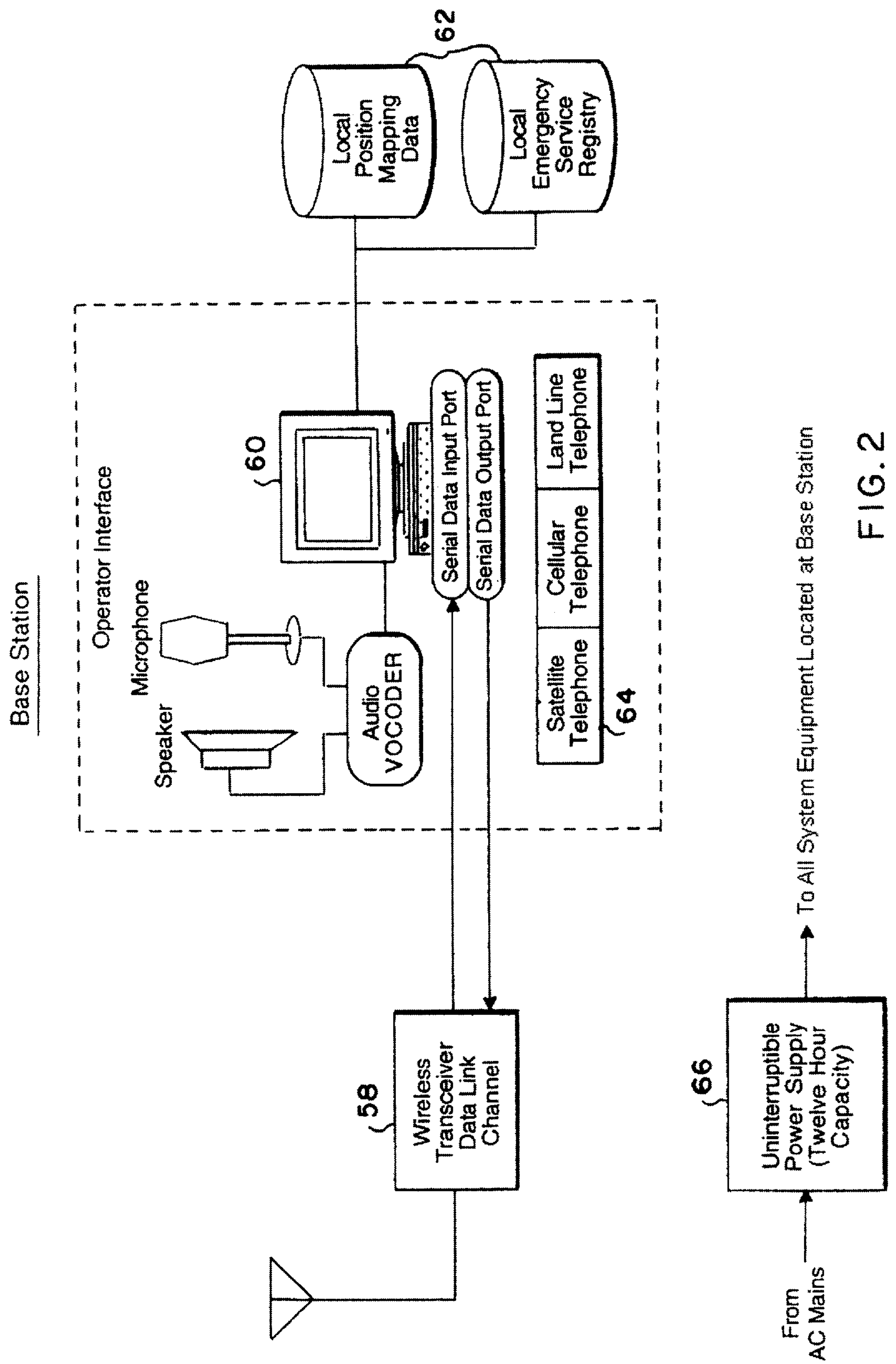
FIG. 2 is a schematic representation of the base station components of the wireless vehicle location and emergency notification system of the present invention, which base station receives information from the vehicle components of FIG. 1 and coordinates emergency services.

As illustrated in FIG. 2, the fixed monitoring station will include a wireless transceiver 58 capable of sending and receiving data and voice signals, a computer workstation 60 having access to a large capacity storage device and database 62 which includes local road and terrain maps as well as emergency service providers, and various phone connections 64 to notify the emergency service providers in the case of an accident or unusual event. The fixed station will have battery back up power 66 and redundant fail safe systems. There may be multiple stations to accommodate call volume or provide local language capabilities.

Figure 3:
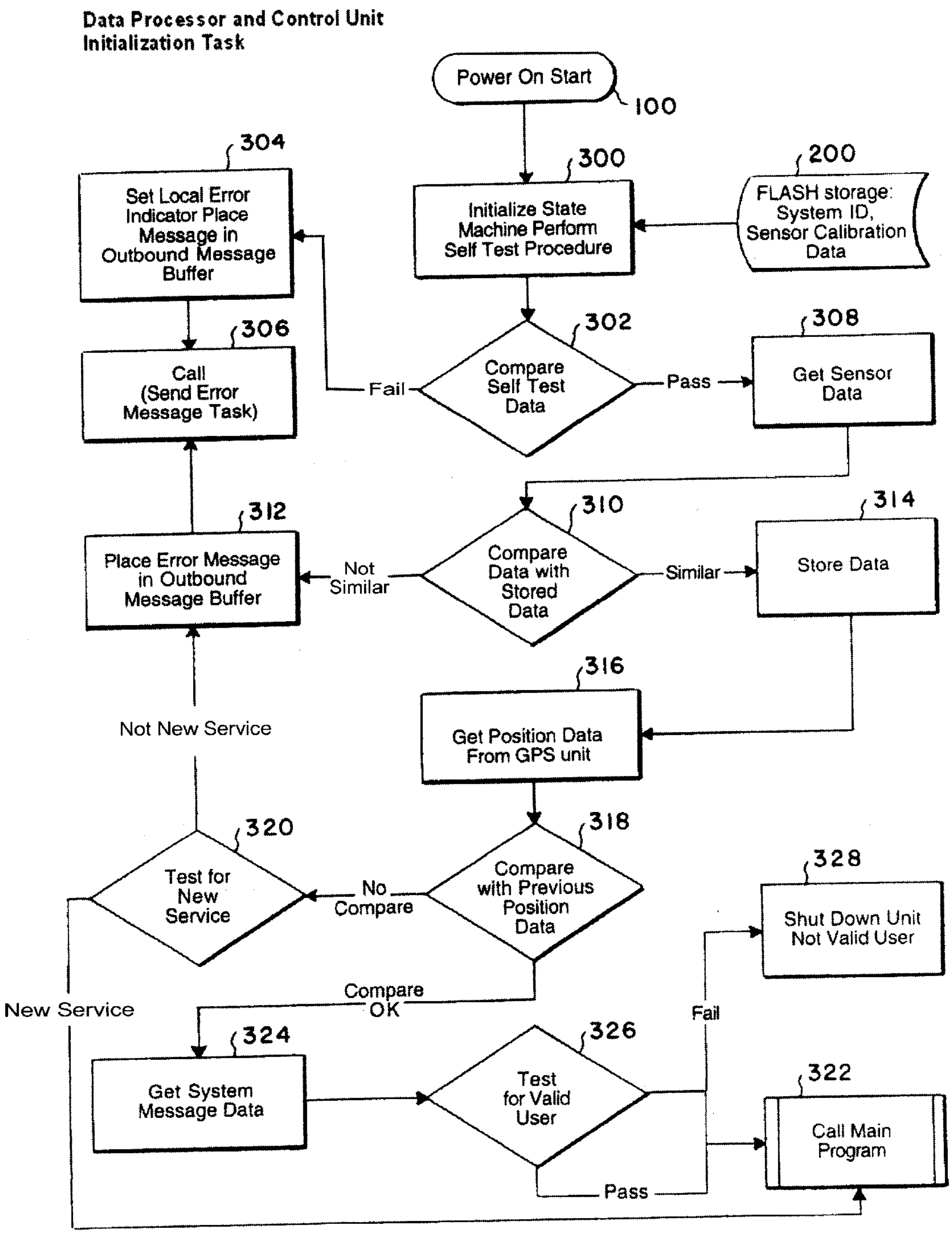

Referring now to FIG. 3, an initialization task flowchart of the data processor and control unit 20 is given. In such flowchart, the unit is powered on to start 100 the initialization. This may occur when the unit is powered on for the first time, or the vehicle ignition is turned on. Data such as system identification, calibrated parameters, and previously stored data are delivered to the processor and control unit 20 from a flash storage device 200. With this information, the processor and control unit 20 begins an initializing and self test procedure 300. This involves testing the integrity of the system and opening communication with necessary components and operations.

The system next compares its own test data 302 in a self-test. If this test fails (the data does not compare with established parameters) a local error message is indicated 304 and the failure is transmitted 306. If the self-test passes, the system next obtains new sensor data 308. This new sensor data 308 is then compared to the last previously stored sensor data 310. If the data is not similar (typically indicating the car is in a different physical position such as being tilted or experiencing mechanical failure since the last reading) an error message 312 is transmitted. If the data is similar, then the new sensor data 308 is stored 314.

Figure 4:
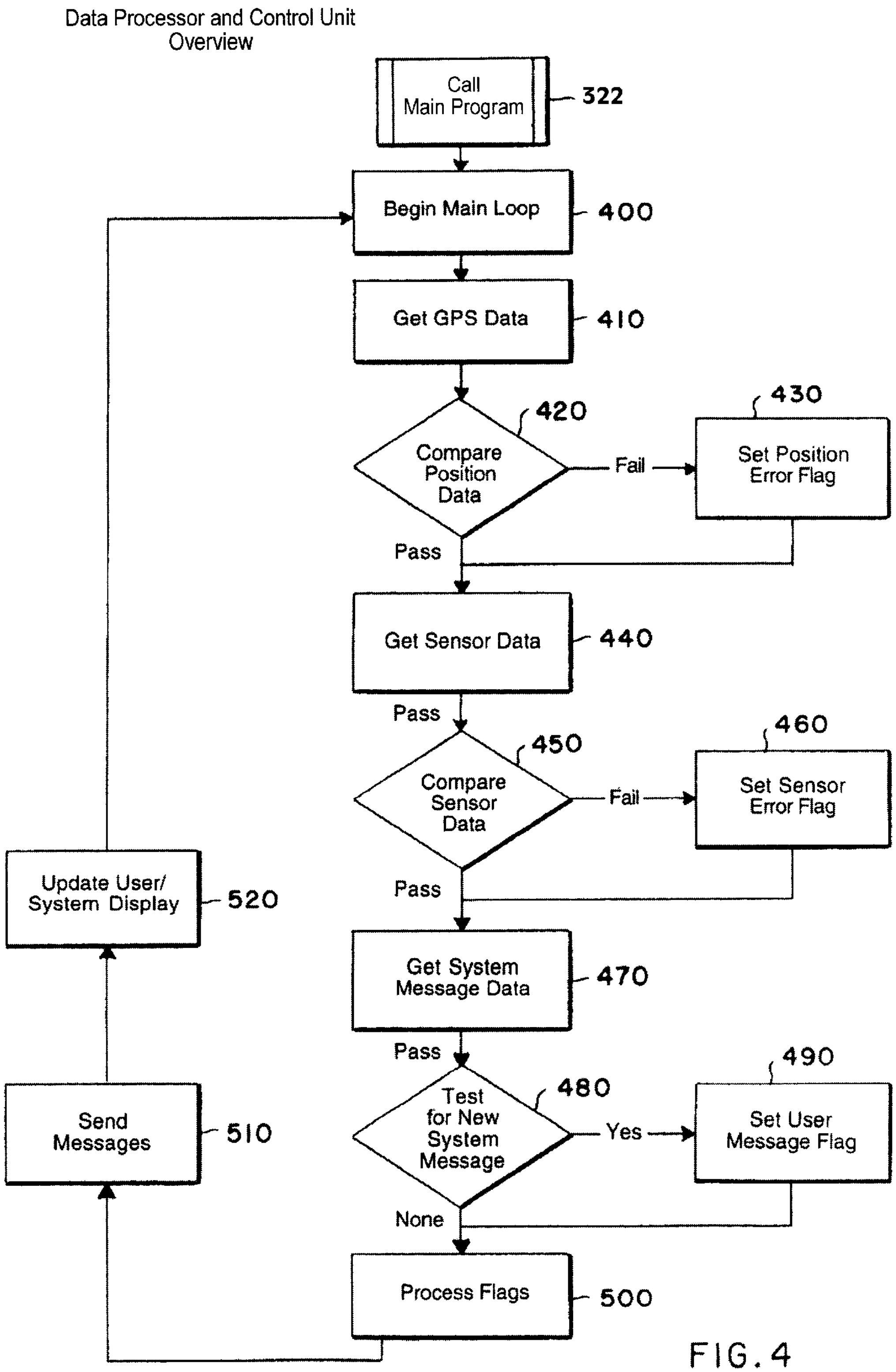
FIG. 4 is a flow chart illustrating the continuous steps taken by a data processor and control unit of the system.

The system next obtains geographic position data 316 from the global position receiver 10. This data is compared with the last previously stored position data 318. If the positions do not compare (as the vehicle may have been stolen, moved, or the system placed on another vehicle) the system tests for new service 320. If it is determined that there is not a new user, an error message is transmitted 312. If the user is found to be new, then the initialization task proceeds to the main program 322, as illustrated in FIG. 4. If the new position data compares with the last recorded position data, the system next checks the message data 324 and tests for the validity of the user 326. If the user is found to be invalid, due to theft or non-payment of service dues, the unit and system is shut down 328. If the user is valid, the system proceeds to the main program 322.

Although the process of a self-check initialization procedure when the vehicle is powered has been described above, it is not necessary to turn on the vehicle in order for the system to work. The system has back-up power and continuously runs through the main program 322 which will be described below. Therefore, in the event of a hit and run or some other form of vandalism, the system would still detect the traumatic event and transmit this information to the base station.

The system also runs continuously, allowing the base station to track the vehicle as it is traveling. Although this may have many applications, a contemplated application is for aircraft which under current circumstances are not able to be tracked over certain "dead spots", such as certain areas of the North Atlantic Ocean. Using the present invention, the aircraft would be trackable at any spot on the earth as it utilizes the global positioning receiver 10 and orbiting satellites to pinpoint the vehicles location instead of conventional radar and other systems which have areas in which they are unable to track vehicles. Continuous tracking would also be possible even when the vehicle is not powered due to the back-up power 48 within the system.

Referring specifically now to FIG. 4, once the data processor and control system is initialized 300, the system begins the main program 322 by entering the main loop 400. The data processor unit 20 obtains global positioning data 410 and compares this data with the last recorded and stored position data 420. If the positions are significantly different, there is a failure and an error transmission 430 is sent. If the positions are similar, the unit next obtains the sensor data 440 and compares the new data with the last stored sensor data 450. If the sensor data comparison is different, there is a failure and an error transmission 460 is sent. However, if the sensor data are similar, the system obtains message data 470, in the form of system specific passwords and codes and tests them 480. If there are passwords and codes, a user message transmission 490 is sent. If not, this information is processed 500 and a message is sent 510 in order that the system be updated 520 to include the specifications and password. The system continuously performs steps 400 through 520 in order to determine whether there has been a traumatic event to the vehicle, which event would be reflected in the sensed attitude or physical condition of the vehicle or geographic position of the vehicle.

For example, if the vehicle were to crash into another object, sensors 18 would register shock and deceleration changes which would activate a transmission to the fixed monitoring station without the need for the occupant's participation. If the alarm were a false alarm, the occupant could cancel the alarm through the user interface unit 46. If the alarm were a true alarm, the fixed station could then open a voice communication link with the occupant, check for other sensed conditions such as temperature and notify the local emergency service of the condition and location of the vehicle.

The system may contain personal information on the occupant or vehicle such as the occupants home telephone number, or vehicle description. This information can be used to aid in the location and identification of the vehicle and its occupant.

The system also aids the user of the system to track his or her vehicle when it has been stolen or vandalized. The sensors 18 may be capable of detecting a broken window, or a car started without a key. The system may use a password entered into the user interface 46 or the user interface be suited for voice recognition to identify a valid user. As the transceiver 14 is able to both transmit as well as receive, the fixed monitoring station could track the location of the vehicle if it detected as being stolen.

Although the description set forth above describes in detail the invention, for purposes of illustration, various modifications may be made without departing from the spirit and scope of the invention. Accordingly, the invention is not to be limited, except as by the appended claims.

What is claimed is:

1. A device for interactively monitoring and taking action based on sensed conditions of vehicles, the device comprising:

a data processor;

communication means in electrical connection with said data processor for automatic communication with the base station, wherein said communication means includes a wireless link that comprises a satellite based transceiver or a land based transceiver, or both a satellite based transceiver and a land based transceiver;

a power supply which is independent of the vehicle's electrical system, is always activated and is in electrical connection with said data processor;

a vehicle transceiver, connected to said power supply and said data processor, for sending transmissions from persons in a vehicle, or for sending and receiving electrical signals to and from the vehicle and to and from the base station, respectively; and an input system connected to a data processor which includes:

a global position receiver in electronic communication with one or more global position satellites and with said data processor, for determining vehicle location and generating position signals;

at least one sensor located in or on the vehicle in electrical connection with the data processor, said at least one sensor comprising a temperature sensor, a pressure sensor, a shock sensor, an attitude sensor, a direction sensor, a wheel position sensor, a wheel revolution sensor, an acceleration and deceleration sensor, or an altitude sensor, or any combination of said sensors, each sensor producing an electrical sensor signal indicating its respective sensed condition of the vehicle;

at least one user interface unit comprising a microphone for receiving a user's voice and generating one or more voice signals representing the user's voice;

analog-to-digital conversion means in electrical communication with the data processor for receiving said sensor signals and said voice signals and converting them to digital sensor data;

self-testing means, including voice recognition means in electrical connection with said data processor for identifying one or more authorized users' voices, and providing a user approved signal indicating that the user's voice is recognized and whether the user is authorized or unauthorized;

wherein said data processor is configured and programmed to respond to said position signals, digital sensor data, said user approved signal and said voice signal to generate output signals indicating information about the condition of the vehicle or the nature of an emergency, or both the condition of the vehicle and the nature of an emergency, based on the sensed data, wherein said data processor continuously compares a present signal of each of said sensors with a previously received signal and with predetermined calibrated parameters that are stored in look up tables in computer memory, to generate a response based on the comparison and on the information stored in said look up tables, which response notifies the driver and/or sends the response by said vehicle transceiver to the base station or to at least one emergency response service provider, or to both the base station and the at least one emergency response service provider, indicating the vehicle's condition thereby anticipating a problem before it occurs or taking action to correct a problem automatically.

2. A vehicle mobile unit for providing location and emergency notification information to a user or a base station and taking action based on such information, the mobile unit comprising:

a data processor;

input-output components, wherein each input-output component is located within or on the outside of a vehicle and is connected physically or wirelessly to said data processor, the input-output components comprising a mobile unit transceiver, wherein said transceiver is capable of receiving transmit signals from the data processor and sending mobile unit transmissions based on said transmit signals, via wireless communication means, to a base station and receiving base station transmissions, and of generating transceiver signals for use by the data processor based on the base station transmissions;

a global position receiver that is able to receive navigation signals from at least one global position satellite, determine the vehicle's geographic location, and generate vehicle location signals indicating said geographic location;

at least one vehicle condition sensor, wherein each of the vehicle condition sensors is able to sense one or more vehicle conditions and to generate at least one vehicle sensor signal indicating information about at least one of the vehicle conditions;

at least one user input sensor, wherein each of the user input sensors is able to sense at least one user input and to generate one or more user input signals indicating information about at least one of the user inputs, wherein at least one of the user input sensors comprises a sound detecting device that is able to sense user input in the form of the user's voice and to generate at least one voice signal representing the user's voice; and, one or more user notification devices whereby the data processor is able to communicate information to the user, wherein at least one of the user notification devices comprises a visual display device or a sound generating device, or both a visual display device and a sound generating device;

an independent electric power supply, wherein said independent power supply is adapted to assure that electric power is available for operation of the data processor, the transceiver, and at least one of the input-output components, when vehicle electrical system power is not available for such operation;

computer memory, comprised of one or more computer memory devices, wherein the computer memory is able to store mobile unit data, said mobile unit data comprising vehicle location information, vehicle sensor information, user input information, including voice recognition information suitable for identifying one or more authorized users' voices, and one or more predetermined calibrated parameters, and wherein said mobile unit data is accessible by the data processor;

wherein said data processor is configured and programmed to read one or more input signals received by the data processor and automatically generate one or more output signals in response to at least one of the input signals, which input signals each comprise at least one of the vehicle location signals,
at least one of the vehicle sensor signals, or
at least one of the user input signals, or
any combination thereof;

wherein the data processor is further configured and programmed to recognize one or more authorized users based upon at least one authorized voice signal, which authorized voice signal comprises at least one of the voice signals representing the voice of the particular authorized user, to generate at least one user-vocalized signal when the at least one authorized voice signal indicates the particular authorized user is making one or more pre-selected user vocalizations, and to send the at least one of the user-vocalized signals via at least one of said communication means to the base station, whereby the base station is advised of a message that has been associated with the one or more pre-selected user vocalizations;

wherein the data processor is further configured and programmed to continuously, while operating, perform a main program loop, wherein the data processor in each cycle through the loop makes a main-loop comparison between at least one input signal and at least one of the predetermined calibrated parameters;

wherein the input signals further comprise the additional alternative of at least one main-loop comparison signal, which main-loop comparison signal indicates the result of one or more of the main-loop comparisons;

wherein the output signals comprise one or more emergency response signals when at least one of the main-loop comparisons indicates, based on predetermined criteria, that an undesirable event is impending; and, wherein one or more of the emergency response signals comprise notification to the user or the base station, or to both the user and the base station, about the status of the vehicle or the user, or the vehicle and the user, vis-à-vis the event.

3. The mobile unit of claim 2, wherein at least one of said communication means includes an Internet link and the data processor is further configured and programmed to communicate via the Internet link.

4. The mobile unit of claim 2, wherein said one or more output signals comprise automatically contacting at least one emergency service provider via at least one of said communication means.

5. The mobile unit of claim 2, wherein said communication means includes at least one satellite.

6. The mobile unit of claim 2, wherein the data processor is configured and programmed to receive at least one predefined command signal from the base station or the user, or both the base station and the user, and to generate a control signal based upon the at least one command signal and communicate the control signal to at least one controllable part of the vehicle, wherein the controllable part is controlled in some respect by the control signal.

7. The mobile unit of claim 2, wherein the data processor is further configured and programmed to generate at least one internal control signal based upon the results of one or more of the main-loop comparisons and communicate the at least one internal control signal to at least one controllable part of the vehicle, wherein the controllable part is controlled in some respect by the internal control signal.

8. The mobile unit of claim 2, wherein the one or more vehicle condition sensors comprise at least one temperature sensor, at least one pressure sensor, at least one shock sensor, at least one attitude sensor, at least one direction sensor, at least one wheel position sensor, at least one wheel revolution sensor, at least one acceleration sensor, or at least one altitude sensor, or any combination of such vehicle condition sensors.

9. The mobile unit of claim 2, wherein the one or more user sensors comprise a manual input device that is able to sense one or more instructions conveyed manually to the manual input device, and to generate at least one manual input signal indicating one or more of the instructions.

10. The mobile unit of claim 2, wherein the data processor is configured and programmed to determine dynamic as well as static characteristics of at least one of the vehicle conditions.

11. The mobile unit of claim 2, wherein at least one of the memory devices has flash memory storage capabilities.

12. The mobile unit of claim 2, wherein at least one of the computer memory devices stores initializing information, wherein the initializing information includes at least part of the voice recognition information sufficient to identify one or more of the authorized users' voices, and wherein the initializing information is accessible to the data processor;

wherein the data processor is further configured and programmed to detect whether vehicle electric power is on or off and to perform an initialization procedure upon detecting that the vehicle electric power has changed from off to on, and wherein said initialization procedure includes one or more initialization comparisons and generation of one or more initialization messages;

wherein at least one of the initialization comparisons comprises a user validity test in which a voice comparison is made between information indicated by the voice signal and the at least part of the voice recognition information, and wherein at least one of the initialization messages includes a user invalidity signal indicating the user is not authorized when the voice comparison resulted in the user's voice not being recognized as the voice of one of the authorized users.

13. The mobile unit of claim 12, wherein the initializing information includes stored self test information, wherein at least one of the initialization comparisons comprises a self test in which a self test comparison is made between initializing self test information and at least part of the stored self test information, and wherein at least one of the initialization messages includes a self test signal indicating a self test error when the self test comparison was not within predetermined self test specifications.

14. The mobile unit of claim 12, wherein the initializing information includes stored sensor information, wherein the one or more initialization comparisons comprises a sensor test in which a sensor data comparison is made between initializing sensor information and at least part of the stored sensor information, and wherein at least one of the initialization messages includes a sensor test signal indicating a sensor data error when the sensor data comparison is not within predetermined sensor test specifications.

15. The mobile unit of claim 12, wherein the initializing information includes stored location information, wherein the at least one initialization comparison comprises a location test in which a location data comparison is made between initializing location information and at least part of the stored location information, and wherein the at least one initialization message includes a location test signal that causes a new service user test to be conducted when the location data comparison is not within predetermined specifications.

16. The mobile unit of claim 12, wherein the data processor is configured and programmed to generate one or more initializing control signals based upon one or more initialization comparisons, including the voice comparison, and communicate the initializing control signal to at least one controllable part of the vehicle, wherein the controllable part is adapted to be controlled in some respect based upon the initializing control signal.

17. A wireless vehicle location and emergency notification system comprising:

a mobile unit and a base station, wherein the mobile unit and the base station are linked to one another by one or more interactive wireless communication means;

wherein the mobile unit comprises a data processor;

input-output components, wherein each input-output component is located within or on the outside of a vehicle and is connected physically or wirelessly to said data processor, the input-output components comprising a transceiver, a global position receiver, at least one vehicle condition sensor, at least one user input sensor, and at least one user notification device;

wherein said transceiver is capable of receiving transmit signals from the data processor and sending mobile unit transmissions based on said transmit signals, via wireless communication means, to the base station and receiving base station transmissions, and of generating transceiver signals for use by the data processor based on the base station transmissions;

wherein the global position receiver is able to receive navigation signals from at least one global position satellite, to determine the vehicle's geographic location, and to generate vehicle location signals indicating said geographic location;

wherein each of the vehicle condition sensors is able to sense one or more vehicle conditions and to generate at least one vehicle sensor signal indicating information about at least one of the vehicle conditions;

wherein each of the user input sensors is able to sense at least one user input caused by a vehicle user and to generate one or more user input signals indicating information about at least one of the user inputs, wherein at least one of the user input sensors comprises a sound detecting device that is able to sense user input in the form of the user's voice and to generate at least one voice signal representing the user's voice; and, wherein each of the user notification devices provides a means whereby the data processor is able to communicate information to the user, wherein at least one of the user notification devices comprises a visual display device or a sound generating device, or both a visual display device and a sound generating device;

an independent electric power supply, wherein said independent power supply is adapted to assure that electric power is available for operation of the data processor, the transceiver, and at least one of the input-output components, when vehicle electrical system power is not available for such operation; computer memory, said computer memory comprising one or more computer memory devices, wherein said computer memory is able to store mobile unit data, said mobile unit data comprising vehicle location information, vehicle sensor information, user input information, including voice recognition information suitable for identifying one or more authorized users' voices, and one or more predetermined calibrated parameters, and wherein said mobile unit data is accessible by the data processor;

wherein said data processor is configured and programmed to read one or more input signals received by the data processor and automatically generate one or more output signals in response to at least one of the input signals, which input signals each comprise at least one of the vehicle location signals, at least one of the vehicle sensor signals, or at least one of the user input signals, or any combination thereof;

wherein the data processor is further configured and programmed to recognize one or more authorized users based upon at least one authorized voice signal, which authorized voice signal comprises at least one of the voice signals representing the voice of the particular authorized user, to generate at least one user-vocalized signal when the at least one authorized voice signal indicates the particular authorized user is making one or more pre-selected user vocalizations, and to send the at least one of the user-vocalized signals via at least one of said communication means to the base station, whereby the base station is advised of a message that has been associated with the one or more pre-selected user vocalizations;

wherein the data processor is further configured and programmed to continuously, while operating, perform a main program loop, wherein the data processor in each cycle through the loop makes a main-loop comparison between at least one input signal and at least one of the predetermined calibrated parameters;

wherein the input signals further comprise the additional alternative of at least one main-loop comparison signal, which main-loop comparison signal indicates the result of one or more of the main-loop comparisons;

wherein the output signals comprise one or more emergency response signals when at least one of the main-loop comparisons indicates, based on predetermined criteria, that an undesirable event is impending; and, wherein one or more of the emergency response signals comprise notification to the user or the base station, or to both the user and the base station, about the status of the vehicle or the user, or the vehicle and the user, vis-à-vis the event, wherein the base station comprises a computer work station;

a base station transceiver in electronic communication with the computer work station and adapted to send information to and receive information from at least one of the mobile units via at least one of the communication means;

a means for maintaining a supply of electric power to the base station even when no power is available to the base station from an external power line, whereby the base station is able to remain in operation on a substantially continuous basis;

means for a base station operator to receive information transmitted from the data processor and to transmit information to the data processor;

a computer storage means for storing base station computer data, wherein the computer work station is configured and programmed for accessing selected portions of said computer data and transmitting information to the data processor based upon the selected portions, on a substantially real time basis;

means for communicating with at least one emergency service provider; and, means for communicating with the user.

18. The system of claim 17, wherein at least one of the computer memory devices stores initializing information, wherein the initializing information includes at least part of the voice recognition information sufficient to identify one or more of the authorized users' voices, whereby the initializing information is accessible to the data processor;

wherein the data processor is further configured and programmed to detect whether vehicle electric power is on or off and to perform an initialization procedure upon detecting that the vehicle electric power has changed from off to on, and wherein said initialization procedure includes one or more initialization comparisons and generation of one or more initialization messages;

wherein at least one of the initialization comparisons comprises a user validity test in which a voice comparison is made between information indicated by the voice signal and the at least part of the voice recognition information, and wherein at least one of the initialization messages includes a user invalidity signal indicating that the user is not authorized when the voice comparison resulted in the user's voice not being recognized as the voice of one of the authorized users.

19. The system of claim 17, wherein the initializing information includes stored self test information, wherein at least one of the initialization comparisons comprises a self test in which a self test comparison is made between initializing self test information and at least part of the stored self test information, and wherein at least one of the initialization messages includes a self test signal indicating a self test error when the self test comparison was not within predetermined self test specifications.

20. The system of claim 17, wherein the initializing information includes stored sensor information, wherein the one or more initialization comparisons comprises a sensor test in which a sensor data comparison is made between initializing sensor information and at least part of the stored sensor information, and wherein at least one of the initialization messages includes a sensor test signal indicating a sensor data error when the sensor data comparison is not within predetermined sensor test specifications.

21. The system of claim 17, wherein the initializing information includes stored location information, wherein the at least one initialization comparison comprises a location test in which a location data comparison is made between initializing location information and at least part of the stored location information, and wherein the at least one initialization message includes a location test signal that causes a new service user test to be conducted when the location data comparison is not within predetermined specifications.

22. The system of claim 17, wherein the data processor is configured and programmed to generate one or more initializing control signals based upon one or more initialization comparisons, including the voice comparison, and communicate the initializing control signal to at least one controllable part of the vehicle, wherein the controllable part is adapted to be controlled in some respect based upon the initializing control signal.

23. A method of operation for a wireless vehicle location and emergency notification system comprising the steps of:

placing one or more components of a mobile unit within or on the outside of a vehicle;

providing electric power for operation of at least one of the mobile unit components when no electric power is available from the vehicle's electrical system, and providing electric power for operation of at least one component of at least one base station when no electric power is available to the at least one base station from any external power line;

maintaining a communication link between the mobile unit and at least one of the base stations, with the communication link being available on a substantially continuous basis;

maintaining a navigational communication link between the mobile unit and one or more global positioning satellites, with the navigational link being available on a substantially continuous basis;

detecting the static and dynamic proximity of the vehicle to an undesirable event, wherein said detecting comprises the steps of sensing the vehicle location using a global position receiver carried within or on the outside of the vehicle, wherein the global position receiver receives navigational signals from the one or more global positioning satellites;

sensing at least one vehicle condition using at least one vehicle condition sensor;

creating a computer data base comprising predetermined calibrated parameters that include static and dynamic values for relationships between the sensed vehicle locations and predetermined locations and between at least one sensed vehicle condition and predetermined vehicle conditions, and storing the data base in computer memory, which memory is accessible to a data processor;

performing a main program loop using the data processor, the data processor being configured and programmed to perform the loop on a substantially continuous basis while the data processor is being operated, wherein performing the loop comprises one or more cycles through the loop wherein each of the cycles comprises the steps of comparing at least one of the sensed vehicle locations with at least one of the parameters, and comparing at least one of the sensed vehicle conditions with at least one of the parameters; and, generating one or more emergency response signals when the result of either of the two immediately preceding steps indicates, based on pre-established criteria, that an undesirable event is impending; and, sending the one or more emergency response signals to one or more communication devices for notifying the user or the base station, or both the user and the base station, about the status of the vehicle or of the user, or of both the vehicle and the user, vis-à-vis the event.

24. The method of claim 23, further comprising the steps of:

detecting when the user is taking action to begin using the vehicle;

performing an initialization procedure before allowing the user to use the vehicle, wherein the initialization procedure comprises the steps of determining if a vehicle user is an authorized user before allowing the user to use the vehicle, wherein said determining of an authorized user step comprises the steps of requiring the user to speak into a sound detecting device that is in electronic communication with a data processor, which data processor is configured and programmed for and performs the steps of receiving voice signal information from the sound detecting device, accessing stored computer voice information that is suitable for identifying the voice of at least one authorized user, verifying whether the user's voice is the voice of an authorized user by comparing the voice signal information to the stored computer voice information, and, if the voice comparison resulted in the user's voice not being recognized as the voice of one of the authorized users, generating a user invalidity signal, sending the user invalidity signal to the base station or to the authorized user, or to the base station and the authorized user, and denying the use of at least one mobile unit part, at least one vehicle part, or any combination of mobile unit parts and vehicle parts, by sending at least one control signal to effectuate said denial of use.

25. The method of claim 23, wherein the initialization procedure further comprises the steps of:

accessing previously stored self test information from the computer memory using the data processor, which data processor is configured and programmed for and performs a self test, wherein the self test comprises the steps of comparing initializing self test information to at least part of the stored self test information, and generating a self test error message when, based on one or more predetermined self test specifications, the self test comparing step indicates that the initializing self test information is not sufficiently similar to the at least part of the stored self test information to pass the self test, and sending the self test error message to the base station or to the authorized user, or to the base station and the authorized user.

26. The method of claim 23, wherein the initialization procedure further comprises the steps of:

accessing previously stored sensor information from the computer memory using the data processor, which data processor is configured and programmed for and performs a sensor data test, wherein the sensor data test comprises the steps of comparing initializing sensor information to at least part of the stored sensor information, and generating a sensor test error message when, based on one or more predetermined self test specifications, the sensor information comparing step indicates that the initializing sensor information is not sufficiently similar to the at least part of the stored sensor information to pass the sensor data test, and sending the sensor test error message to the base station or to the authorized user, or to the base station and the authorized user.

27. The method of claim 23, wherein the initialization procedure further comprises the steps of:

accessing previously stored location information from the computer memory using the data processor, which data processor is configured and programmed for and performs a location data test, wherein the location data test comprises the steps of comparing initializing location information to at least part of the stored location information, and conducting a new service test when, based on one or more predetermined self test specifications, the location information comparing step indicates that the initializing location information is not sufficiently similar to the at least part of the stored location information to pass the location data test, wherein the new service test comprises the steps of determining if there is a new service user whose new use of the mobile unit is consistent with the mobile unit not passing the location data test, generating a new service error message if the new user service determination is that there is no said new service user, and sending the new service error message to the base station or to the authorized user, or to the base station and the authorized user.

* * * * *